United States Patent
DiGiovanni et al.

(10) Patent No.: US 9,388,640 B2
(45) Date of Patent: *Jul. 12, 2016

(54) POLYCRYSTALLINE COMPACTS INCLUDING NANOPARTICULATE INCLUSIONS AND METHODS OF FORMING SUCH COMPACTS

(71) Applicant: Baker Hughes Incorporated, Houston, TX (US)

(72) Inventors: Anthony A. DiGiovanni, Houston, TX (US); Danny E. Scott, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 377 days.

This patent is subject to a terminal disclaimer.

(21) Appl. No.: 13/904,590

(22) Filed: May 29, 2013

(65) Prior Publication Data

US 2013/0256039 A1  Oct. 3, 2013

Related U.S. Application Data

(63) Continuation of application No. 12/901,253, filed on Oct. 8, 2010, now Pat. No. 8,496,076.

(60) Provisional application No. 61/252,049, filed on Oct. 15, 2009.

(51) Int. Cl.
*E21B 10/36* (2006.01)
*E21B 10/567* (2006.01)
(Continued)

(52) U.S. Cl.
CPC ............... *E21B 10/567* (2013.01); *C04B 35/52* (2013.01); *C04B 35/6303* (2013.01);
(Continued)

(58) Field of Classification Search
CPC . E21B 2010/561; E21B 10/46; E21B 10/567; E21B 10/55; C01B 31/0206; C01B 31/022; B23B 2228/44; B23B 27/20; B23B 2226/315
See application file for complete search history.

(56) References Cited

U.S. PATENT DOCUMENTS 3,745,623 A  7/1973  Wentorf, Jr. et al.
4,224,380 A  9/1980  Bovenkerk et al.
(Continued)

FOREIGN PATENT DOCUMENTS

EP  1253123 A1  10/2002
WO  2004078641 A1  9/2004
(Continued)

OTHER PUBLICATIONS

Arima, Makoto, et al., "Diamond nucleation and growth by reduction of carbonate melts under high-pressure and high-temperature conditions," Geology, vol. 30, No. 8, pp. 691-694, Aug. 2002.
(Continued)

*Primary Examiner* — Cathleen Hutchins
(74) *Attorney, Agent, or Firm* — TraskBritt

(57) ABSTRACT

Polycrystalline compacts include non-catalytic nanoparticles in interstitial spaces between interbonded grains of hard material in a polycrystalline hard material. Cutting elements and earth-boring tools include such polycrystalline compacts. Methods of forming polycrystalline compacts include sintering hard particles and non-catalytic nanoparticles to faun a polycrystalline material. Methods of forming cutting elements include infiltrating interstitial spaces between interbonded grains of hard material in a polycrystalline material with a plurality of non-catalytic nanoparticles.

20 Claims, 3 Drawing Sheets

(51) Int. Cl.
| | |
|---|---|
| *C04B 35/52* | (2006.01) |
| *C04B 35/63* | (2006.01) |
| *C04B 35/645* | (2006.01) |
| *C22C 26/00* | (2006.01) |

(52) U.S. Cl.
CPC ............. *C04B 35/645* (2013.01); *C22C 26/00* (2013.01); *E21B 10/36* (2013.01); *C04B 2235/3839* (2013.01); *C04B 2235/3856* (2013.01); *C04B 2235/3886* (2013.01); *C04B 2235/427* (2013.01); *Y10T 428/25* (2015.01)

(56) References Cited

U.S. PATENT DOCUMENTS

| | | | |
|---|---|---|---|
| 4,231,195 A | 11/1980 | DeVries et al. | |
| 4,505,721 A | 3/1985 | Almond et al. | |
| 4,610,699 A | 9/1986 | Yazu | |
| RE32,380 E | 3/1987 | Wentorf, Jr. et al. | |
| 5,011,514 A | 4/1991 | Cho et al. | |
| 5,096,465 A | 3/1992 | Chen et al. | |
| 5,127,923 A | 7/1992 | Bunting et al. | |
| 5,151,107 A | 9/1992 | Cho et al. | |
| 5,205,684 A | 4/1993 | Meskin et al. | |
| 5,370,195 A | 12/1994 | Keshavan et al. | |
| 5,536,485 A | 7/1996 | Kume et al. | |
| 5,954,147 A | 9/1999 | Overstreet et al. | |
| 6,009,963 A | 1/2000 | Chaves et al. | |
| 6,063,149 A | 5/2000 | Zimmer | |
| 6,090,343 A | 7/2000 | Kear et al. | |
| 6,194,481 B1 | 2/2001 | Furman et al. | |
| 6,248,447 B1 | 6/2001 | Griffin et al. | |
| 6,548,264 B1 | 4/2003 | Tan et al. | |
| 6,852,414 B1 | 2/2005 | Frushour | |
| 7,037,583 B2 | 5/2006 | Furman et al. | |
| 7,060,641 B2 | 6/2006 | Qian et al. | |
| 7,070,635 B2 | 7/2006 | Frushour | |
| 7,309,526 B2 | 12/2007 | Smith et al. | |
| 7,396,505 B2 | 7/2008 | Pope et al. | |
| 7,397,558 B2 | 7/2008 | Kamins et al. | |
| 7,493,973 B2 | 2/2009 | Keshavan et al. | |
| 7,510,034 B2 | 3/2009 | Curry et al. | |
| 7,516,804 B2 * | 4/2009 | Vail ................ | 175/434 |
| 7,527,860 B2 | 5/2009 | Chih et al. | |
| 7,556,743 B2 | 7/2009 | Furman et al. | |
| 7,635,035 B1 | 12/2009 | Bertagnolli et al. | |
| 7,971,663 B1 | 7/2011 | Vail | |
| 8,074,748 B1 | 12/2011 | Miess et al. | |
| 8,496,076 B2 | 7/2013 | DiGiovanni et al. | |
| 8,579,052 B2 | 11/2013 | DiGiovanni et al. | |
| 8,800,693 B2 | 8/2014 | DiGiovanni | |
| 8,893,829 B2 | 11/2014 | DiGiovanni | |
| 2004/0238227 A1 | 12/2004 | Smith et al. | |
| 2005/0019114 A1 | 1/2005 | Sung | |
| 2005/0051366 A1 | 3/2005 | Frushour | |
| 2005/0133277 A1 | 6/2005 | Dixon | |
| 2005/0186104 A1 | 8/2005 | Kear et al. | |
| 2006/0162969 A1 | 7/2006 | Belnap et al. | |
| 2006/0191722 A1 | 8/2006 | Belnap et al. | |
| 2007/0056778 A1 | 3/2007 | Webb et al. | |
| 2007/0079994 A1 | 4/2007 | Middlemiss | |
| 2007/0144790 A1 | 6/2007 | Fang et al. | |
| 2007/0151769 A1 | 7/2007 | Slutz et al. | |
| 2007/0187153 A1 | 8/2007 | Bertagnolli | |
| 2007/0234646 A1 | 10/2007 | Can et al. | |
| 2008/0023230 A1 | 1/2008 | Cho | |
| 2008/0023231 A1 | 1/2008 | Vail | |
| 2008/0073126 A1 | 3/2008 | Shen et al. | |
| 2008/0073127 A1 | 3/2008 | Zhan et al. | |
| 2008/0115424 A1 | 5/2008 | Can et al. | |
| 2008/0127475 A1 | 6/2008 | Griffo | |
| 2008/0168717 A1 | 7/2008 | Can et al. | |
| 2008/0179104 A1 | 7/2008 | Zhang et al. | |
| 2008/0206576 A1 | 8/2008 | Qian et al. | |
| 2008/0209818 A1 * | 9/2008 | Belnap et al. ............... | 51/307 |
| 2008/0210473 A1 | 9/2008 | Zhang et al. | |
| 2008/0282618 A1 | 11/2008 | Lockwood | |
| 2009/0071726 A1 | 3/2009 | Belnap et al. | |
| 2009/0095538 A1 | 4/2009 | Middlemiss | |
| 2009/0107291 A1 | 4/2009 | Levashov et al. | |
| 2009/0152015 A1 | 6/2009 | Sani et al. | |
| 2010/0213247 A1 | 8/2010 | Egan et al. | |
| 2010/0243335 A1 | 9/2010 | Dourfaye et al. | |
| 2010/0294571 A1 | 11/2010 | Belnap et al. | |
| 2011/0023375 A1 | 2/2011 | Sani et al. | |
| 2011/0023377 A1 | 2/2011 | Digiovanni | |
| 2011/0031034 A1 | 2/2011 | Digiovanni et al. | |
| 2011/0031037 A1 | 2/2011 | Bellin et al. | |
| 2011/0036643 A1 | 2/2011 | Belnap et al. | |
| 2011/0061942 A1 | 3/2011 | Digiovanni | |
| 2011/0088954 A1 | 4/2011 | Digiovanni et al. | |
| 2011/0214921 A1 | 9/2011 | Naidoo | |
| 2011/0252712 A1 | 10/2011 | Chakraborty et al. | |
| 2012/0037431 A1 | 2/2012 | DiGiovanni et al. | |
| 2012/0111642 A1 | 5/2012 | DiGiovanni | |
| 2013/0008093 A1 | 1/2013 | DiGiovanni | |
| 2014/0013670 A1 | 1/2014 | DiGiovanni et al. | |

FOREIGN PATENT DOCUMENTS

| | | |
|---|---|---|
| WO | 2006032982 A1 | 3/2006 |
| WO | 2006032984 A2 | 3/2006 |
| WO | 2006032984 A3 | 3/2006 |
| WO | 2007035394 A2 | 3/2007 |
| WO | 2007088461 A1 | 8/2007 |
| WO | 2007110770 A2 | 10/2007 |
| WO | 2007144731 A2 | 12/2007 |
| WO | 2007144731 A3 | 12/2007 |
| WO | 2007144733 A2 | 12/2007 |
| WO | 2007149266 A1 | 12/2007 |
| WO | 2007148214 A3 | 5/2008 |
| WO | 2008053431 A1 | 5/2008 |
| WO | 2008079205 A1 | 7/2008 |
| WO | 2008094190 A2 | 8/2008 |
| WO | 2008096314 A2 | 8/2008 |
| WO | 2008114228 A1 | 9/2008 |
| WO | 2009132035 A1 | 10/2009 |

OTHER PUBLICATIONS

Athanassiou, E.K., et al., "Large-scale production of carbon-coated copper nanoparticles for sensor applications," Nanotechnology, vol. 17, pp. 1668-1673, 2006.

Banhart, F., et al., "Carbon onions as nanoscopic pressure cells for diamond formation," Nature, vol. 382, pp. 433-435, Aug. 1, 1996.

Berger, Michael, "A green synthesis technique for fabricating carbon-coated magnetic nanoparticles," 2 pages, posted Aug. 15, 2006, copyright 2006 Nanowerk LLC.

Beulens, J.J., et al., "Diamond, Graphite, and Amorphous Carbon Deposition," Le Vide, Les Couches Minces—Supplement No. 256, pp. 329-331, Mar.-Apr. 1991.

Dahl, J.E., et al., "Isolation and Structure of Higher Diamondoids, Nanometer-Sized Diamond Molecules," Science, vol. 299, pp. 96-99, Jan. 3, 2003.

Fangli, Yuan, et al., "Preparation of zinc oxide nano-particles coated with aluminum," Journal of Materials Science Letters, vol. 20, pp. 1549-1551, 2001.

Furman et al., Structural and Mechanical Behavior of Layered Zirconium Phosphonate as a Distributed Phase in Polycaprolactone, Journal of Applied Polymer Science, vol. 114, pp. 993-1001, 2009.

Ghiringhelli, L.M., et al., "Local Structure of Liquid Carbon Controls Diamond Nucleation," Physical Review Letters, vol. 99, No. 5, pp. 055702-1 through 055702-4, Aug. 3, 2007.

Giber, J., et al., "Critical Point Energies in hcp and fcc Cobalt from Appearance Potential Spectra," Appl. Phys. A., vol. 52, pp. 167-170, 1991.

International Search Report for International Application No. PCT/US2010/052062 mailed May 24, 2011, 4 pages.

International Written Opinion for International Application No. PCT/US2010/052062 mailed May 24, 2011, 6 pages.

(56) References Cited

OTHER PUBLICATIONS

International Preliminary Report on Patentability and Written Opinion for International Application No. PCT/US2010/052062 mailed Apr. 17, 2012, 7 pages.

Itoh, M., et al., "Amorphous carbon nitride film preparation by plasma-assisted pulsed laser deposition method," Appl. Phys. A, vol. 79, pp. 1575-1578, 2004.

Kidalov, S.V., et al., "Thermal conductivity of nanocomposites based on diamonds and nanodiamonds," Diamond & Related Materials, vol. 16, pp. 2063-2066, 2007.

Li, Junjie, et al., "Field emission enhancement of amorphous carbon films by nitrogen-implantation," Carbon, vol. 42, pp. 2309-2314, 2004.

Li, Q.Y., et al., "Photocatalytic characterization of silica coated titania nanoparticles with tunable coatings," Journal of Nanoparticle Research, vol. 7, pp. 295-299, 2005.

Liu, Huimin, et al., "Diamond Chemical Vapor Deposition, Nucleation and Early Growth Stages," Dept. of Chemical and Vioresource Engineering, Colorado State University, ISBN 0-8155-1380-1, Noyes Publications, 198 pages, 1995.

Liu, Huimin, et al., "Nucleation Kinetics of Diamond on Carbide-Forming Substrates during Chemical Vapor Deposition," J. Electrochem. Soc., vol. 143, No. 3, pp. 1104-1109, Mar. 1996.

Liu, Huimin, et al., "Studies on nucleation process in diamond CVD: an overview of recent developments," Diamond and Related Materials, vol. 4, pp. 1173-1188, 1995.

Majetich, S.A., et al., "Preparation and properties of carbon-coated magnetic nanocrystallites," Phys. Rev. B, vol. 48, pp. 16845-16848, 1993.

Meilunas, R.J., et al., "Diamond Nucleation on Surfaces Using Carbon Clusters," Office of Naval Research, Technical Report No. 12, Dept. of Materials Science and Engineering, Northwestern University, prepared for publication in the Journal of Materials Research, 61 pages, May 1993.

Osipov, A.S., et al., "Rapid sintering of nano-diamond compacts," Diamond & Related Materials, 4 pages, 2009.

Qian, J., et al., "Graphitization of diamond powders of different sizes at high pressure-high temperature," Carbon, vol. 42, pp. 2691-2697, 2004.

Qian, J., et al., "Micron diamond composites with nanocrystalline silicon carbide bonding," J. Mater. Res., vol. 18, No. 5, pp. 1173-1178, May 2003.

Sadangi, Rajendra K., et al., "WC-Co-Diamond Nano-Composites," NanoStructured Materials, vol. 12, pp. 1031-1034, 1999.

Schmidt, S., et al., "Watching the Growth of Bulk Grains During Recrystallization of Deformed Metals," Science, vol. 305, pp. 229-232, Jul. 9, 2004.

Sumiya, Hitoshi, et al., "Synthesis of High-Purity Nano-Polycrystalline Diamond and Its Characterization," SEI Technical Review, No. 59, pp. 52-59, Jan. 2005.

Wang, Guangzu, et al., "Effect of Recrystallized Graphite on the Nucleation of Diamond in Film Growth Reactions," Science and Technology of New Diamond, pp. 257-259, 1990.

Wei, Xian-Wen, et al., "A solution phase fabrication of magnetic nanoparticles encapsulated in carbon," Nanotechnology, vol. 17, pp. 4307-4311, 2006.

Welz, Sascha, et al., "Nucleation, growth, and graphitization of diamond nanocrystals during chlorination of carbides," Journal of Applied Physics, vol. 93, No. 7, pp. 4207-4214, Apr. 1, 2003.

Wheeler, N.S., "Microstructural Characterization of Cobalt-Tungsten Coated Graphite Fibers," J. Res. Natl. Inst. Stand. Technol., vol. 100, No. 6, pp. 641-659, Nov.-Dec. 1995.

Wu, B.Y.C., et al., "Nanostructured Ni—Co Alloys with Tailorable Grain Size and Twin Density," Metallurgical and Materials Transactions A, vol. 36A, pp. 1927-1936, Jul. 2005.

Yanchuk, I.B., et al., "Raman scattering, AFM and nanoindentation characterization of diamond films obtained by hot filament CVD," Diamond and Related Materials, vol. 12, pp. 266-269, 2004.

Yushin, G.N., et al., "Effect of sintering on structure of nanodiamond," Diamond and Related Materials, vol. 14, pp. 1721-1729, 2005.

Zhang, L., et al., "Ultrafine and nanoscaled tungsten carbide synthesis from colloidal carbon coated nano tungsten precursor," Powder Metallurgy, vol. 49, No. 4, pp. 369-373, 2006.

Zhao, Y., et al., "Superhard B-C-N materials synthesized in nanostructured bulks," J. Mater. Res., vol. 17, No. 12, pp. 3139-3145, Dec. 2002.

\* cited by examiner

POLYCRYSTALLINE COMPACTS INCLUDING NANOPARTICULATE INCLUSIONS AND METHODS OF FORMING SUCH COMPACTS

CROSS-REFERENCE TO RELATED APPLICATIONS

This application is a continuation of U.S. patent application Ser. No. 12/901,253, filed Oct. 8, 2010, now U.S. Pat. No. 8,496,076 issued, Jul. 30, 2013, which claims the benefit of U.S. Provisional Patent Application Ser. No. 61/252,049, filed Oct. 15, 2009, the disclosure of each of which is hereby incorporated herein in its entirety by this reference.

FIELD

The present invention relates generally to polycrystalline compacts, which may be used, for example, as cutting elements for earth-boring tools, and to methods of forming such polycrystalline compacts, cutting elements, and earth-boring tools.

BACKGROUND

Earth-boring tools for forming wellbores in subterranean earth formations generally include a plurality of cutting elements secured to a body. For example, fixed-cutter earth-boring rotary drill bits (also referred to as "drag bits") include a plurality of cutting elements that are fixedly attached to a bit body of the drill bit. Similarly, roller cone earth-boring rotary drill bits may include cones that are mounted on bearing pins extending from legs of a bit body such that each cone is capable of rotating about the bearing pin on which it is mounted. A plurality of cutting elements may be mounted to each cone of the drill bit. In other words, earth-boring tools typically include a bit body to which cutting elements are attached.

The cutting elements used in such earth-boring tools often include polycrystalline diamond compacts (often referred to as "PDCs"), which act as cutting faces of a polycrystalline diamond material. Polycrystalline diamond material is material that includes interbonded grains or crystals of diamond material. In other words, polycrystalline diamond material includes direct, inter-granular bonds between the grains or crystals of diamond material. The terms "grain" and "crystal" are used synonymously and interchangeably herein.

Polycrystalline diamond compact cutting elements are typically formed by sintering and bonding together relatively small diamond grains under conditions of high temperature and high pressure in the presence of a catalyst (e.g., cobalt, iron, nickel, or alloys and mixtures thereof) to form a layer (e.g., a compact or "table") of polycrystalline diamond material on a cutting element substrate. These processes are often referred to as high temperature/high pressure (HTHP) processes. The cutting element substrate may comprise a cermet material (i.e., a ceramic-metal composite material) such as, for example, cobalt-cemented tungsten carbide. In such instances, the cobalt (or other catalyst material) in the cutting element substrate may be swept into the diamond grains during sintering and serve as the catalyst material for forming the inter-granular diamond-to-diamond bonds, and the resulting diamond table, from the diamond grains. In other methods, powdered catalyst material may be mixed with the diamond grains prior to sintering the grains together in an HTHP process.

Upon formation of a diamond table using an HTHP process, catalyst material may remain in interstitial spaces between the grains of diamond in the resulting polycrystalline diamond compact. The presence of the catalyst material in the diamond table may contribute to thermal damage in the diamond table when the cutting element is heated during use, due to friction at the contact point between the cutting element and the formation.

Polycrystalline diamond compact cutting elements in which the catalyst material remains in the polycrystalline diamond compact are generally thermally stable up to a temperature of about seven hundred fifty degrees Celsius (750° C.), although internal stress within the cutting element may begin to develop at temperatures exceeding about three hundred fifty degrees Celsius (350° C.). This internal stress is at least partially due to differences in the rates of thermal expansion between the diamond table and the cutting element substrate to which it is bonded. This differential in thermal expansion rates may result in relatively large compressive and tensile stresses at the interface between the diamond table and the substrate, and may cause the diamond table to delaminate from the substrate. At temperatures of about seven hundred fifty degrees Celsius (750° C.) and above, stresses within the diamond table itself may increase significantly due to differences in the coefficients of thermal expansion of the diamond material and the catalyst material within the diamond table. For example, cobalt thermally expands significantly faster than diamond, which may cause cracks to form and propagate within the diamond table, eventually leading to deterioration of the diamond table and ineffectiveness of the cutting element.

Furthermore, at temperatures at or above about seven hundred fifty degrees Celsius (750° C.), some of the diamond crystals within the polycrystalline diamond compact may react with the catalyst material causing the diamond crystals to undergo a chemical breakdown or back-conversion to another allotrope of carbon or another carbon-based material. For example, the diamond crystals may graphitize at the diamond crystal boundaries, which may substantially weaken the diamond table. In addition, at extremely high temperatures, in addition to graphite, some of the diamond crystals may be converted to carbon monoxide and carbon dioxide.

In order to reduce the problems associated with differential rates of thermal expansion and chemical breakdown of the diamond crystals in polycrystalline diamond compact cutting elements, so-called "thermally stable" polycrystalline diamond compacts (which are also known as thermally stable products, or "TSPs") have been developed. Such a thermally stable polycrystalline diamond compact may be formed by leaching the catalyst material (e.g., cobalt) out from interstitial spaces between the interbonded diamond crystals in the diamond table using, for example, an acid or combination of acids (e.g., aqua regia). Substantially all of the catalyst material may be removed from the diamond table, or catalyst material may be removed from only a portion thereof. Thermally stable polycrystalline diamond compacts in which substantially all catalyst material has been leached out from the diamond table have been reported to be thermally stable up to temperatures of about twelve hundred degrees Celsius (1,200° C.). It has also been reported, however, that such fully leached diamond tables are relatively more brittle and vulnerable to shear, compressive, and tensile stresses than are non-leached diamond tables. In addition, it is difficult to secure a completely leached diamond table to a supporting substrate. In an effort to provide cutting elements having polycrystalline diamond compacts that are more thermally stable relative to non-leached polycrystalline diamond compacts, but that are also relatively less brittle and vulnerable to shear, compressive, and tensile stresses relative to fully leached diamond tables, cutting elements have been provided that include a diamond table in which the catalyst material has been leached from a portion or portions of the diamond table. For example, it is known to leach catalyst material from a cutting face, from the side of the diamond table, or both, to a desired depth within the diamond table, but without leaching all of the catalyst material out from the diamond table.

BRIEF SUMMARY

In some embodiments, the present invention includes polycrystalline compacts that comprise a plurality of grains of hard material that are interbonded to form a polycrystalline hard material, and a plurality of non-catalytic nanoparticles disposed in interstitial spaces between the grains of hard material.

In additional embodiments, the present invention includes cutting elements comprising at least one such polycrystalline compact.

In additional embodiments, the present invention includes earth-boring tools that include a body, and at least one such polycrystalline compact carried by the body.

In further embodiments, the present invention includes methods of forming polycrystalline compacts, in which a plurality of hard particles and a plurality of non-catalytic nanoparticles are sintered to form a polycrystalline hard material comprising a plurality of interbonded grains of hard material.

In additional embodiments, the present invention includes methods of forming cutting elements in which interstitial spaces between interbonded grains of hard material in a polycrystalline material are infiltrated with a plurality of non-catalytic nanoparticles.

BRIEF DESCRIPTION OF THE DRAWINGS

While the specification concludes with claims particularly pointing out and distinctly claiming what are regarded as embodiments of the present invention, various features and advantages of embodiments of the invention may be more readily ascertained from the following description of some embodiments of the invention when read in conjunction with the accompanying drawings, in which:

DETAILED DESCRIPTION

The illustrations presented herein are not actual views of any particular polycrystalline compact, microstructure of a polycrystalline compact, particle, cutting element, or drill bit, and are not drawn to scale, but are merely idealized representations employed to describe the present invention. Additionally, elements common between figures may retain the same numerical designation.

As used herein, the term "drill bit" means and includes any type of bit or tool used for drilling during the formation or enlargement of a wellbore and includes, for example, rotary drill bits, percussion bits, core bits, eccentric bits, bi-center bits, reamers, mills, drag bits, roller cone bits, hybrid bits and other drilling bits and tools known in the art.

As used herein, the term "nanoparticle" means and includes any particle having an average particle diameter of about 500 nm or less.

As used herein, the term "polycrystalline material" means and includes any material comprising a plurality of grains or crystals of the material, which grains are bonded directly together by inter-granular bonds. The crystal structures of the individual grains of the material may be randomly oriented in space within the polycrystalline material.

As used herein, the term "polycrystalline compact" means and includes any structure comprising a polycrystalline material formed by a process that involves application of pressure (e.g., compaction) to the precursor material or materials used to form the polycrystalline material.

As used herein, the term "inter-granular bond" means and includes any direct atomic bond (e.g., covalent, metallic, etc.) between atoms in adjacent grains of material.

As used herein, the term "catalyst material" refers to any material that is capable of substantially catalyzing the formation of inter-granular bonds between grains of hard material during an HTHP process. For example, catalyst materials for diamond include cobalt, iron, nickel, other elements from Group VIIIA of the Periodic Table of the Elements, and alloys thereof.

As used herein, the term "non-catalytic material" refers to any material that is not a catalyst material.

As used herein, the term "non-catalytic nanoparticle" means and includes any nanoparticle that is not comprised of a catalytic material, diamond, or cubic boron nitride. Non-catalytic nanoparticles, in some embodiments, may comprise materials that are not any type of hard material, as defined below.

As used herein, the term "hard material" means and includes any material having a Knoop hardness value of about 2,000 Kg/mm$^2$ (20 GPa) or more. In some embodiments, the hard materials employed herein may have a Knoop hardness value of about 3,000 Kg/mm$^2$ (29.4 GPa) or more. Such materials include, for example, diamond and cubic boron nitride.

Figure 1A:
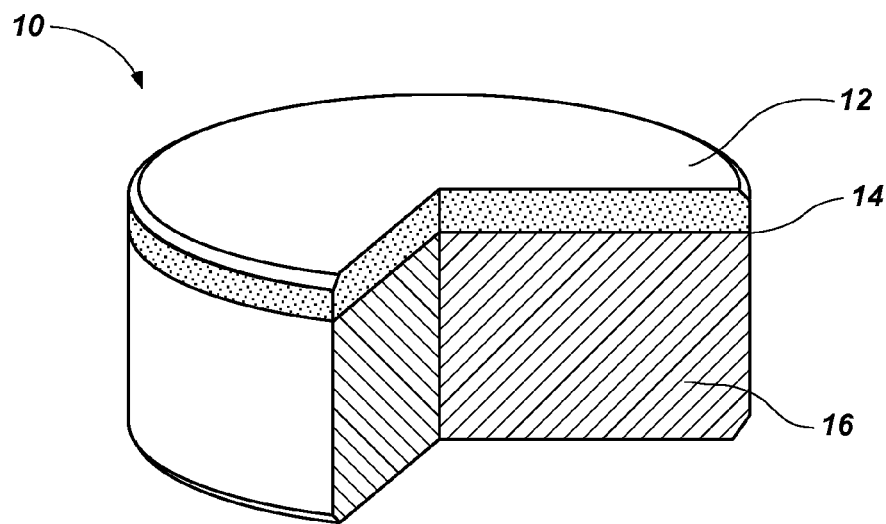
FIG. 1A is a partial cut-away perspective view illustrating an embodiment of a cutting element comprising a polycrystalline compact of the present invention.

FIG. 1A is a simplified, partially cut-away perspective view of an embodiment of a cutting element 10 of the present invention. The cutting element 10 comprises a polycrystalline compact in the form of a layer of hard polycrystalline material 12, also known in the art as a polycrystalline table, that is provided on (e.g., formed on or attached to) a supporting substrate 16 with an interface 14 therebetween. Though the cutting element 10 in the embodiment depicted in FIG. 1A is cylindrical or disc-shaped, in other embodiments, the cutting element 10 may have any desirable shape, such as a dome, cone, chisel, etc.

In some embodiments, the polycrystalline material 12 comprises polycrystalline diamond. In such embodiments, the cutting element 10 may be referred to as a polycrystalline diamond compact (PDC) cutting element. In other embodiments, the polycrystalline material 12 may comprise another hard material such as, for example, polycrystalline cubic boron nitride.

Figure 1B:
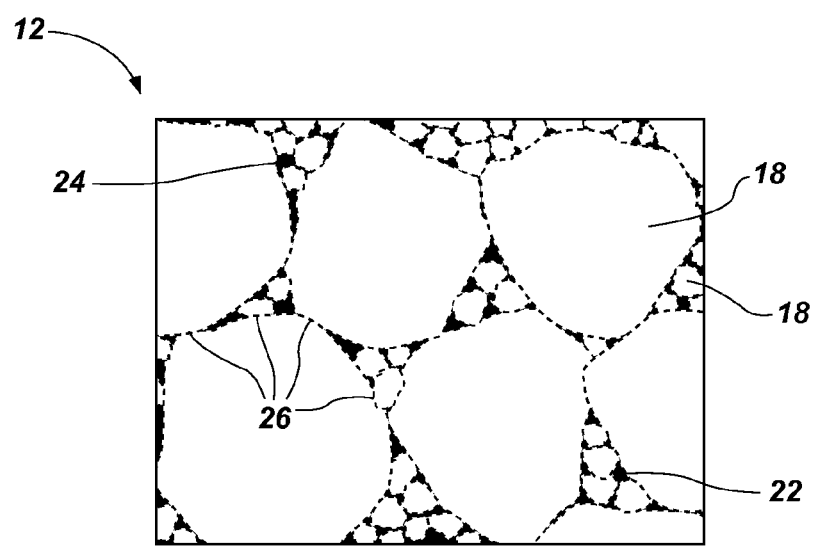
FIG. 1B is a simplified drawing showing how a microstructure of the polycrystalline compact of FIG. 1A may appear under magnification, and illustrates interbonded and interspersed larger and smaller grains of hard material.

FIG. 1B is an enlarged view illustrating how a microstructure of the polycrystalline material 12 of the cutting element 10 of FIG. 1A may appear under magnification. As discussed in further detail below, the polycrystalline material 12 includes interbonded grains 18 of hard material. The polycrystalline material 12 also includes nanoparticles disposed in interstitial spaces 22 between the interbonded grains 18 of hard material. These nanoparticulate inclusions in the polycrystalline material 12 may reduce an amount of catalyst material remaining in the polycrystalline material 12 after a catalyst material is used to catalyze formation of the polycrystalline material 12 in a sintering process, such as a high temperature, high pressure (HTHP) process. In other words, at least substantially non-catalytic nanoparticulate inclusions (i.e., nanoparticles) may be incorporated into the polycrystalline material 12 such that the amount of catalyst material remaining in interstitial spaces 22 between the interbonded grains 18 of hard material in the microstructure after the sintering process is reduced by volumetric exclusion based on the presence of the non-catalyst nanoparticles. The spatial volume occupied by these nanoparticulates cannot be occupied by catalyst material, and, hence, the amount of catalyst material in the polycrystalline material 12 is reduced. The overall reduction of catalytic material in the grain boundary regions between the interbonded grains 18 of hard material may lead to an increase in thermal stability of the cutting element 10 by having a reduced coefficient of thermal expansion mismatch effect from the reduced content of catalyst material. Furthermore, in embodiments in which the hard material comprises diamond, the reduction of catalytic material in between the interbonded grains 18 of hard material may also decrease the susceptibility of the diamond to graphitize (often referred to as "reverse graphitization") for substantially the same reasons.

The nanoparticles disposed in the interstitial spaces 22 between the interbonded grains 18 of hard material may comprise a non-catalytic material. The non-catalytic material of the nanoparticles may comprise, for example, one or more of elementary metals (e.g., commercially pure tungsten), metal alloys (e.g., tungsten alloys), intermetallic compounds, ceramics (e.g., carbides, nitrides, oxides), and combinations thereof As particular non-limiting examples, the non-catalytic nanoparticles may comprise carbides, nitrides, or carbonitrides of refractory metals such as hafnium, vanadium, molybdenum, tungsten, niobium, and titanium.

As shown in FIG. 1B, the grains 18 of the polycrystalline material 12 optionally may have a multi-modal (e.g., bi-modal, tri-modal, etc.) grain size distribution. In some embodiments, the polycrystalline material 12 may comprise a multi-modal grain size distribution as disclosed in at least one of Provisional U.S. patent application Ser. No. 61/232,265, which was filed on Aug. 7, 2009, and titled "Polycrystalline Compacts Including In-Situ Nucleated Grains, Earth-Boring Tools Including Such Compacts, and Methods of Forming Such Compacts and Tools," and U.S. patent application Ser. No. 12/558,184, which was filed on Sep. 11, 2009, and titled "Polycrystalline Compacts Having Material Disposed in Interstitial Spaces Therein, Cutting Elements and Earth-Boring Tools Including Such Compacts, and Methods of Forming Such Compacts," the disclosures of each of which are incorporated herein in its entirety by this reference.

For example, the layer of hard polycrystalline material 12 may include a first plurality of grains 18 of hard material having a first average grain size, and at least a second plurality of grains 18 of hard material having a second average grain size that differs from the first average grain size of the first plurality of grains 18. The second plurality of grains 18 may be larger than the first plurality of grains 18. For example, the average grain size of the larger grains 18 may be at least about one hundred fifty (150) times greater than the average grain size of the smaller grains 18. In additional embodiments, the average grain size of the larger grains 18 may be at least about five hundred (500) times greater than the average grain size of the smaller grains 18. In yet further embodiments, the average grain size of the larger grains 18 may be at least about seven hundred fifty (750) times greater than the average grain size of the smaller grains 18. The smaller grains 18 and the larger grains 18 may be interspersed and interbonded to form the layer of hard polycrystalline material 12. In other words, in embodiments in which the polycrystalline material 12 comprises polycrystalline diamond, the smaller grains 18 and the larger grains 18 may be mixed together and bonded directly to one another by inter-granular diamond-to-diamond bonds 26 (represented by dashed lines in FIG. 1B).

As known in the art, the average grain size of grains within a microstructure may be determined by measuring grains of the microstructure under magnification. For example, a scanning electron microscope (SEM), a field emission scanning electron microscope (FESEM), or a transmission electron microscope (TEM) may be used to view or image a surface of a polycrystalline material 12 (e.g., a polished and etched surface of the polycrystalline material 12). Commercially available vision systems are often used with such microscopy systems, and these vision systems are capable of measuring the average grain size of grains within a microstructure.

By way of example and not limitation, in embodiments in which the average grain size of the smaller grains 18 is between about one nanometer (1 nm) and about one hundred fifty nanometers (150 nm), the average grain size of the larger grains 18 may be between about five microns (5 μm) and about forty microns (40 μm). Thus, in some embodiments, the ratio of the average grain size of the larger grains 18 to the average grain size of the smaller grains 18 may be between about 33:1 and about 40,000:1.

The large difference in the average grain size between the smaller grains 18 and the larger grains 18 may result in smaller interstitial spaces 22 or voids (represented as shaded areas in FIG. 1B) within the microstructure of the polycrystalline material 12 (relative to conventional polycrystalline materials), and the total volume of the interstitial spaces 22 or voids may be more evenly distributed throughout the microstructure of the polycrystalline material 12. As a result, any material present within the interstitial spaces 22 (e.g., a carbon compound or a catalyst material, as described below) may also be more evenly distributed throughout the microstructure of the polycrystalline material 12 within the relatively smaller interstitial spaces 22 therein.

In some embodiments, the number of smaller grains 18 per unit volume of the polycrystalline material 12 may be higher than the number of larger grains 18 per unit volume of the polycrystalline material 12.

The smaller grains 18 may comprise between about one-half of one percent (0.5%) and about thirty percent (30%) by volume of the polycrystalline material 12. More specifically, the smaller grains 18 may comprise between about one-half of one percent (0.5%) and about ten percent (10%) by volume of the polycrystalline material 12, or even between about one-half of one percent (0.5%) and about five percent (5%) by volume of the polycrystalline material 12. The remainder of the volume of the polycrystalline material 12 may be substantially comprised by the larger grains 18. A relatively small percentage of the remainder of the volume of the polycrystalline material 12 (e.g., less than about ten percent (10%))

may comprise interstitial spaces 22 between the smaller grains 18 and the larger grains 18 of hard material.

In some embodiments, the smaller grains 18 may comprise in-situ nucleated grains 18 of hard material, as disclosed in the aforementioned provisional U.S. patent application Ser. No. 61/232,265, which was filed on Aug. 7, 2009.

The interstitial spaces 22 between the grains 18 of hard material may be at least partially filled with non-catalytic nanoparticles and with a catalyst material.

The non-catalytic nanoparticle inclusions in the polycrystalline material 12 may exhibit one or more of the following characteristics.

The nanoparticle inclusions may have an average major axis length below five hundred nanometers (500 nm).

The chemical composition of the non-catalytic nanoparticle inclusions may be selected such that they do not degrade, suppress, or otherwise adversely affect the sintering of the grains 18 of hard material during a sintering process (e.g., an HTHP process) used to form the polycrystalline material 12 (although they may, in some embodiments, control or prevent abnormal grain growth of the grains 18).

The chemical composition of the non-catalytic nanoparticle inclusions may be selected such that they do not catalyze degradation of the hard material after the sintering process (e.g., an HTHP process) used to form the polycrystalline material 12, or contribute to any increase in catalytic activity within the polycrystalline material 12 after the sintering process. In some embodiments, the nanoparticle inclusions may effectively reduce the catalytic activity within the polycrystalline material 12 after the sintering process. In other words, for example, if the polycrystalline material 12 comprises polycrystalline diamond, the nanoparticle inclusions may effectively reduce the susceptibility of the polycrystalline diamond to reverse graphitization.

The non-catalytic nanoparticle inclusions may be functionalized to facilitate their inclusion with the grains 18 of hard material. In other words, exterior surfaces of the non-catalytic nanoparticles may be at least partially coated with a substance (e.g., an organic material) that facilitates controlled distribution of the nanoparticles with the matrix grains of hard materials during pre-sintering processing, and may also promote adhesion of the nanoparticles to the grains 18 of hard material. Furthermore, the materials used to functionalize one or more of the non-catalytic nanoparticles, particles of hard material, and particles of catalyst material may be modified during processing in any desirable manner by, for example, changing or removing functional groups in the molecules of the functionalizing material. As non-limiting examples, in some embodiments, the non-catalytic nanoparticles may be functionalized as described in provisional U.S. patent application Ser. No. 61/324,142, filed Apr. 14, 2010 and entitled Method of Preparing Polycrystalline Diamond from Derivatized Nanodiamond, the disclosure of which is incorporated herein in its entirety by this reference.

Figure 2:
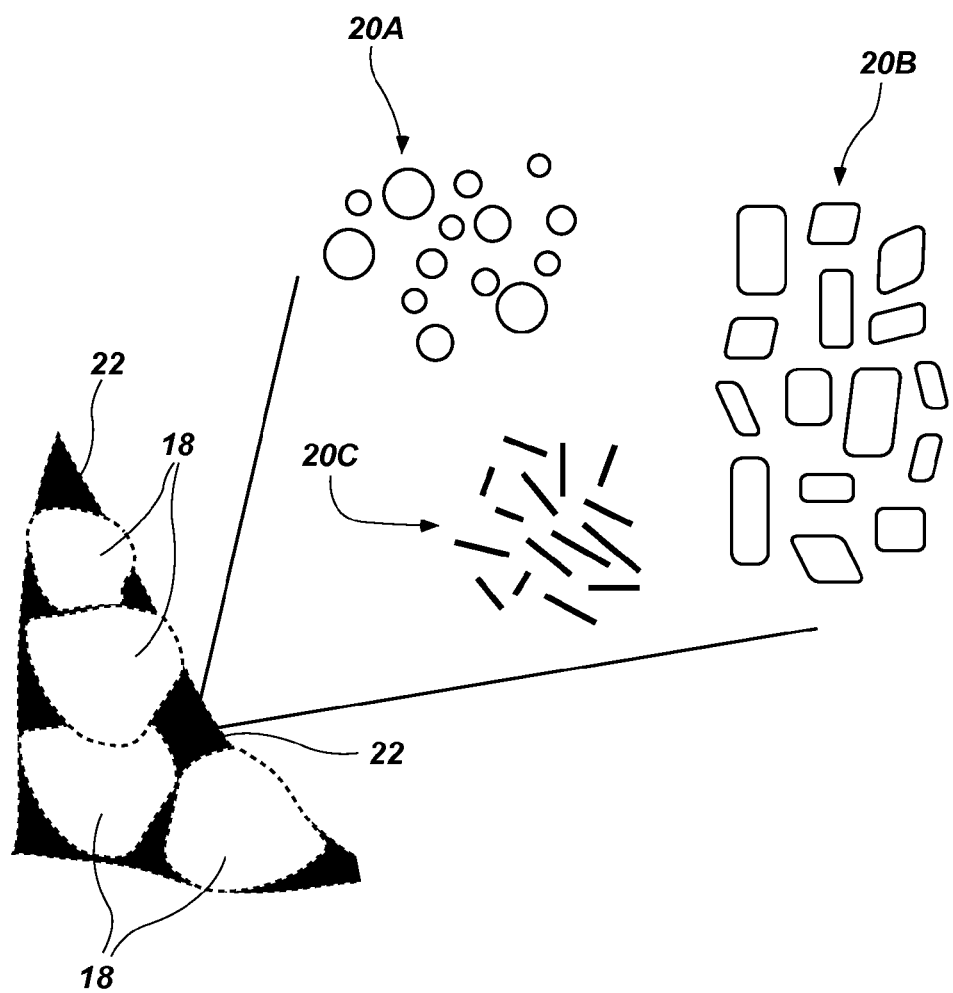
FIG. 2 includes an enlarged view of a portion of FIG. 1B, as well as simplified diagrams illustrating different types of nanoparticles that may be used in fabricating a polycrystalline compact like that shown in FIGS. 1A and 1B.

FIG. 2 includes an enlarged view of a portion of FIG. 1B, as well as simplified diagrams illustrating different types of non-catalytic nanoparticles that may be included in the polycrystalline material 12 within the interstitial spaces 22 between the grains 18 of hard material.

As shown in FIG. 2, in some embodiments, the non-catalytic nanoparticles may comprise generally spherical nanoparticles 20A, generally disc-shaped or platelet-shaped nanoparticles 20B (which may be round or non-round), whisker or fiber nanoparticles 20C, or a combination of one or more such nanoparticles.

The volume occupied by the non-catalytic nanoparticles in the polycrystalline material 12 may be in a range extending from about 0.01% to about 50% of the volume occupied by the grains 18 of hard material in the polycrystalline material 12.

Some of the non-catalytic nanoparticles may be mechanically bonded to the grains 18 of hard material after the sintering process (e.g., an HPHT process) used to form the polycrystalline material 12.

In some embodiments, the polycrystalline material 12 may also include a catalyst material 24 disposed in interstitial spaces 22 between the interbonded grains 18 of the polycrystalline hard material. The catalyst material 24 may comprise a catalyst used to catalyze the formation of the inter-granular bonds 26 between the grains of the smaller grains 18 and the larger grains 18 of the polycrystalline material 12. In other embodiments, however, the interstitial spaces 22 between the grains 18 in some, or all regions of the polycrystalline material 12 may be at least substantially free of such a catalyst material 24. In such embodiments, the interstitial spaces 22 may comprise voids filled with gas (e.g., air), in addition to any non-catalytic nanoparticles present therein.

In embodiments in which the polycrystalline material 12 comprises polycrystalline diamond, the catalyst material 24 may comprise a Group VIIIA element (e.g., iron, cobalt, or nickel) or an alloy thereof, and the catalyst material 24 may comprise between about one-half of one percent (0.1%) and about ten percent (10%) by volume of the hard polycrystalline material 12. In additional embodiments, the catalyst material 24 may comprise a carbonate material such as, for example, a carbonate of one or more of magnesium, calcium, strontium, and barium. Carbonates may also be used to catalyze the formation of polycrystalline diamond.

The layer of hard polycrystalline material 12 of the cutting element 10 may be formed using a high temperature/high pressure (HTHP) process. Such processes, and systems for carrying out such processes, are generally known in the art. In some embodiments, the polycrystalline material 12 may be formed on a supporting substrate 16 (as shown in FIG. 1A) of cemented tungsten carbide or another suitable substrate material in a conventional HTHP process of the type described, by way of non-limiting example, in U.S. Pat. No. 3,745,623 to Wentorf et al. (issued Jul. 17, 1973), or may be formed as a freestanding polycrystalline material 12 (i.e., without the supporting substrate 16) in a similar conventional HTHP process as described, by way of non-limiting example, in U.S. Pat. No. 5,127,923 to Bunting et al. (issued Jul. 7, 1992), the disclosure of each of which patents is incorporated herein in its entirety by this reference. In some embodiments, the catalyst material 24 may be supplied from the supporting substrate 16 during an HTHP process used to form the polycrystalline material 12. For example, the substrate 16 may comprise a cobalt-cemented tungsten carbide material. The cobalt of the cobalt-cemented tungsten carbide may serve as the catalyst material 24 during the HTHP process. Furthermore, in some embodiments, the non-catalytic nanoparticles also may be supplied from the supporting substrate 16 during an HTHP process used to form the polycrystalline material 12. For example, the substrate 16 may comprise a cobalt-cemented tungsten carbide material that also includes non-catalytic nanoparticles therein. The cobalt and the non-catalytic nanoparticles of the substrate 16 may sweep into the hard material grains 18 process.

To form the polycrystalline material 12 in an HTHP process, a particulate mixture comprising particles (e.g., grains) of hard material and non-catalytic nanoparticles may be subjected to elevated temperatures (e.g., temperatures greater than about one thousand degrees Celsius (1,000° C.)) and elevated pressures (e.g., pressures greater than about five gigapascals (5.0 GPa)) to form inter-granular bonds 26 (FIG. 1B) between the particles of hard material, thereby forming the interbonded grains 18 of the hard polycrystalline material 12. In some embodiments, the particulate mixture may be subjected to a pressure greater than about six gigapascals (6.0 GPa) and a temperature greater than about one thousand and five hundred degrees Celsius (1,500° C.) in the HTHP process.

The time at the elevated temperatures and pressures may be relatively short when compared to conventional HTHP processes to prevent the atoms of the smaller grains 18 from diffusing to, and being incorporated into, the larger grains 18. For example, in some embodiments, the particulate mixture may be subjected to a pressure greater than about six gigapascals (6.0 GPa) and a temperature greater than about one thousand and five hundred degrees Celsius (1,500° C.) for less than about two minutes (2.0 min.) during the HTHP process.

In embodiments in which a carbonate catalyst material 24 (e.g., a carbonate of one or more of magnesium, calcium, strontium, and barium) is used to catalyze the formation of polycrystalline diamond, the particulate mixture may be subjected to a pressure greater than about seven point seven gigapascals (7.7 GPa) and a temperature greater than about two thousand degrees Celsius (2,000° C.).

The particulate mixture may comprise hard particles for forming the grains 18 of hard material previously described herein. The particulate mixture may also comprise at least one of particles of catalyst material 24, and non-catalytic nanoparticles. In some embodiments, the particulate mixture may comprise a powder-like substance. In other embodiments, however, the particulate mixture may be carried by (e.g., on or in) another material, such as a paper or film, which may be subjected to the HTHP process. An organic binder material also may be included with the particulate mixture to facilitate processing.

Thus, in some embodiments, the non-catalytic nanoparticles may be admixed with the hard particles used to form the grains 18 to form a particulate mixture, which then may be sintered in an HPHT process.

In some embodiments, the non-catalytic nanoparticles may be admixed with the hard particles used to form the grains 18 of hard material prior to a modified HPHT sintering process used to synthesize a nanoparticulate composite that includes the non-catalytic nanoparticles and nanoparticles of hard material.

In some embodiments, the non-catalytic nanoparticles may be grown on, attached, adhered, or otherwise connected to the hard particles used to form the grains 18 prior to the sintering process. The non-catalytic nanoparticles may be attached to the hard particles by functionalizing exterior surfaces of at least one of the non-catalytic nanoparticles and the hard particles. After attaching the non-catalytic nanoparticles to the hard particles, the resulting particulate mixture may be subjected to an HPHT process to form a polycrystalline material 12, as described above.

In additional embodiments, the non-catalytic nanoparticles may be combined with the catalyst material prior to the sintering process. For example, the non-catalytic nanoparticles may be grown on, attached, adhered, or otherwise connected to particles of catalyst material (which particles of catalyst material may also be or include nanoparticles of catalyst material in some embodiments of the invention), and the coated particles of catalyst material may be combined with hard particles to form the particulate mixture prior to the sintering process. The non-catalytic nanoparticles may be attached to the particles of catalyst material by functionalizing exterior surfaces of at least one of the non-catalytic nanoparticles and the catalyst particles. After attaching the non-catalytic nanoparticles to the catalyst particles and admixing with hard particles, the resulting particulate mixture may be subjected to an HPHT process to form a polycrystalline material 12, as described above.

In some embodiments, the non-catalytic nanoparticles may be grown on, attached, adhered, or otherwise connected to both particles of hard material and particles of catalyst material, and the coated particles may be combined to form the particulate mixture.

As previously mentioned, a particulate mixture that includes hard particles for forming the interbonded grains 18 of hard material, and, optionally, non-catalytic nanoparticles and/or a catalyst material 24 (for catalyzing the formation of inter-granular bonds 26 between the smaller grains 18 and the larger grains 18), may be subjected to an HTHP process to form a polycrystalline material 12. As non-limiting examples, the particulate mixture may comprise a mixture as described in, and may be formed by the processes described in, the aforementioned provisional U.S. patent application Ser. No. 61/324,142, filed Apr. 14, 2010 and entitled Method of Preparing Polycrystalline Diamond from Derivatized Nanodiamond. After the HTHP process, catalyst material 24 (e.g., cobalt) and non-catalytic nanoparticles may be disposed in at least some of the interstitial spaces 22 between the interbonded smaller grains 18 and larger grains 18.

Optionally, the catalyst material 24, the non-catalytic nanoparticles, or both the catalyst material 24 and the non-catalytic nanoparticles may be removed from the polycrystalline material 12 after the HTHP process using processes known in the art. For example, a leaching process may be used to remove the catalyst material 24 and/or the non-catalytic nanoparticles from the interstitial spaces 22 between the grains 18 of hard material. By way of example and not limitation, the polycrystalline material 12 may be leached using a leaching agent and process such as those described more fully in, for example, U.S. Pat. No. 5,127,923 to Bunting et al. (issued Jul. 7, 1992), and U.S. Pat. No. 4,224,380 to Bovenkerk et al. (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material 24 and/or non-catalytic nanoparticles from the interstitial spaces 22. It is also known to use boiling hydrochloric acid (HCl) and boiling hydrofluoric acid (HF) as leaching agents. One particularly suitable leaching agent is hydrochloric acid (HCl) at a temperature of above one hundred ten degrees Celsius (110° C.), which may be provided in contact with the polycrystalline material 12 for a period of about two (2) hours to about sixty (60) hours, depending upon the size of the body of polycrystalline material 12. After leaching the polycrystalline material 12, the interstitial spaces 22 between the interbonded smaller grains 18 and larger grains 18 of hard material within the polycrystalline material 12 subjected to the leaching process may be at least substantially free of catalyst material 24 used to catalyze formation of inter-granular bonds 26 between the grains 18 in the polycrystalline material 12, and may be at least substantially free of non-catalytic nanoparticles. Furthermore, only a portion of the polycrystalline material 12 may be subjected to the leaching process, or the entire body of the polycrystalline material 12 may be subjected to the leaching process.

In additional embodiments of the present invention, non-catalytic nanoparticles may be introduced into the interstitial spaces 22 between interbonded grains 18 of hard, polycrystalline material 12 after catalyst material 24 and any other material in the interstitial spaces 22 has been removed from the interstitial spaces 22 (e.g., by a leaching process). For example, after subjecting a polycrystalline material 12 to a leaching process, non-catalytic nanoparticles may be introduced into the interstitial spaces 22 between the grains 18 of hard material in the polycrystalline material 12. Non-catalytic nanoparticles may be suspended in a liquid (e.g., water or another polar solvent) to form a suspension, and the leached polycrystalline material 12 may be soaked in the suspension to allow the liquid and the non-catalytic nanoparticles to infiltrate into the interstitial spaces 22. The liquid (and the non-catalytic nanoparticles suspended therein) may be drawn into the interstitial spaces 22 by capillary forces. In some embodiments, pressure may be applied to the liquid to facilitate infiltration of the liquid suspension into the interstitial spaces 22.

After infiltrating the interstitial spaces 22 with the liquid suspension, the polycrystalline material 12 may be dried to remove the liquid from the interstitial spaces 22, leaving behind the non-catalytic nanoparticles therein. Optionally, a thermal treatment process may be used to facilitate the drying process.

The polycrystalline material 12 then may be subjected to a thermal process (e.g., a standard vacuum furnace sintering process) to at least partially sinter the non-catalytic nanoparticles within the interstitial spaces 22 in the polycrystalline material 12. Such a process may be carried out below any temperature that might be detrimental to the polycrystalline material 12.

Figure 3:
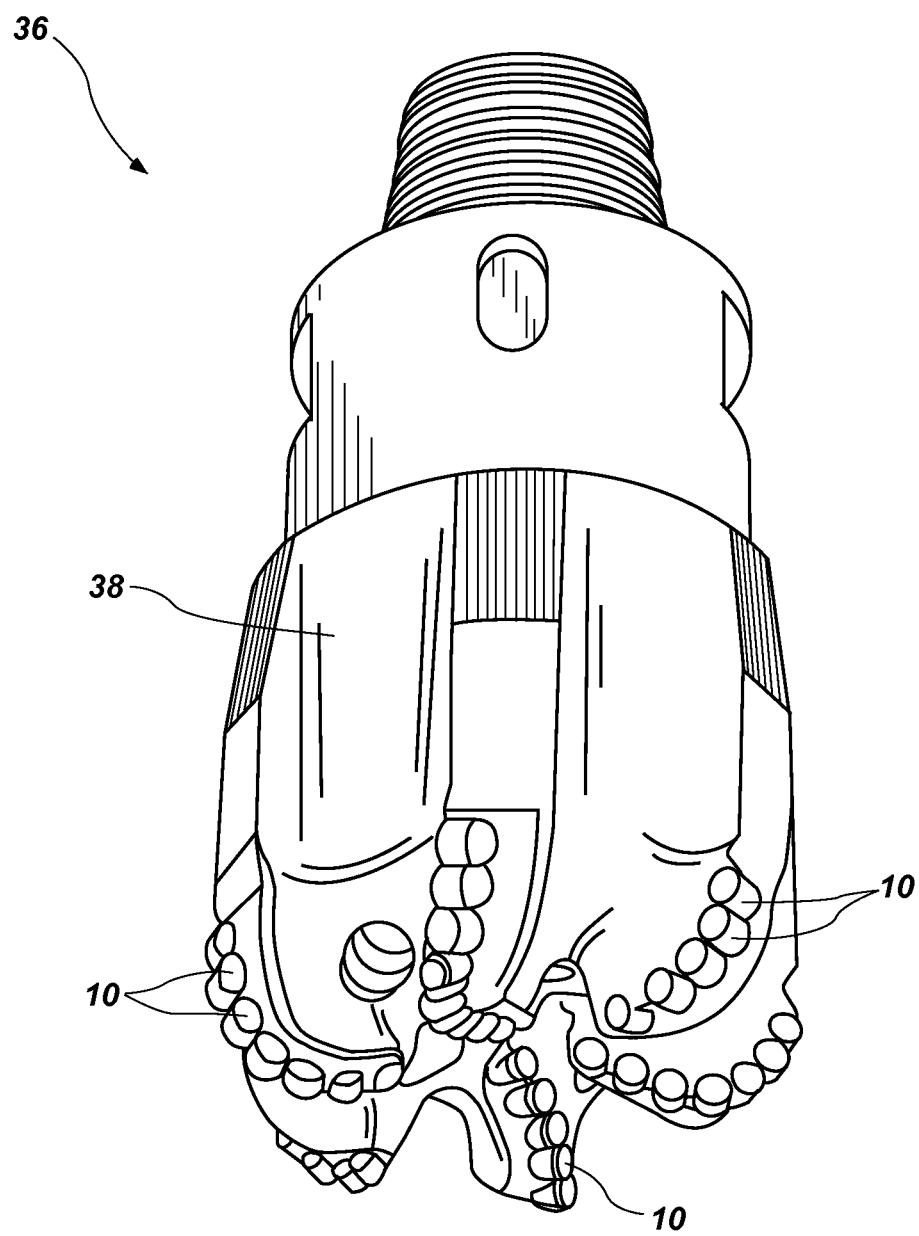
FIG. 3 is a perspective view of an embodiment of a fixed-cutter earth-boring rotary drill bit that includes a plurality of polycrystalline compacts like that shown in FIGS. 1A and 1B carried by a body of the drill bit.

Embodiments of cutting elements 10 of the present invention that include a polycrystalline compact comprising polycrystalline material 12 formed as previously described herein, such as the cutting element 10 illustrated in FIG. 1A, may be formed and secured to an earth-boring tool such as, for example, a rotary drill bit, a percussion bit, a coring bit, an eccentric bit, a reamer tool, a milling tool, etc., for use in forming wellbores in subterranean formations. As a non-limiting example, FIG. 3 illustrates a fixed-cutter type earth-boring rotary drill bit 36 that includes a plurality of cutting elements 10, each of which includes a polycrystalline compact comprising polycrystalline material 12 as previously described herein. The rotary drill bit 36 includes a bit body 38, and the cutting elements 10, which include polycrystalline compacts 12, are carried by (e.g., bonded to) the bit body 38. The cutting elements 10 may be brazed (or otherwise secured) within pockets formed in the outer surface of the bit body 38.

Polycrystalline hard materials that include non-catalytic nanoparticles in interstitial spaces between the interbonded grains of hard material, as described hereinabove, may exhibit improved thermal stability, improved mechanical durability, or both improved thermal stability and improved mechanical durability relative to previously known polycrystalline hard materials. By including the non-catalytic nanoparticles in the interstitial spaces between the interbonded grains of hard material, less catalyst material may be disposed in interstitial spaces between the grains in the ultimate polycrystalline hard material, which may improve one or both of the thermal stability and the mechanical durability of the polycrystalline hard material.

Additional non-limiting example embodiments of the invention are described below.

Embodiment 1: A polycrystalline compact, comprising: a plurality of grains of hard material, the plurality of grains of hard material being interbonded to form a polycrystalline hard material; and a plurality of non-catalytic nanoparticles disposed in interstitial spaces between the grains of hard material.

Embodiment 2: The polycrystalline compact of Embodiment 1, wherein the plurality of grains of hard material comprises grains of diamond.

Embodiment 3: The polycrystalline compact of Embodiment 1 or Embodiment 2, wherein the nanoparticles of the plurality of non-catalytic nanoparticles comprise at least one of a metal, a metal alloy, an intermetallic compound, and a ceramic.

Embodiment 4: The polycrystalline compact of any one of Embodiments 1 through 3, wherein the nanoparticles of the plurality of non-catalytic nanoparticles comprise at least one of a carbide, a nitride, and an oxide.

Embodiment 5: The polycrystalline compact of any one of Embodiments 1 through 4, further comprising a catalyst material in the interstitial spaces between the grains of hard material.

Embodiment 6: The polycrystalline compact of any one of Embodiment 1 through 5, wherein the plurality of grains of hard material comprises: a plurality of smaller grains of hard material having a first average grain size; and a plurality of larger grains of hard material having a second average grain size that is at least about one hundred fifty (150) times larger than the first average grain size.

Embodiment 7: The polycrystalline compact of Embodiment 6, wherein the second average grain size is between two hundred fifty (250) times and seven hundred fifty (750) times larger than the first average grain size.

Embodiment 8: The polycrystalline compact of Embodiment 6 or Embodiment 7, wherein the first average grain size is between about one nanometer (1 nm) and about one hundred fifty nanometers (150 nm), and the second average grain size is between about five microns (5 μm) and about forty microns (40 μm).

Embodiment 9: The polycrystalline compact of any one of Embodiments 1 through 8, wherein a total volume occupied by the plurality of non-catalytic nanoparticles in the polycrystalline hard material is in a range extending from about 0.01% to about 50% of a total volume occupied by the grains of hard material in the polycrystalline hard material.

Embodiment 10: A cutting element, comprising: a substrate; and a polycrystalline compact as recited in any one of Embodiments 1 through 9 on the substrate.

Embodiment 11: An earth-boring tool comprising a body and a polycrystalline compact as recited in any one of Embodiments 1 through 9 carried by the body.

Embodiment 12: The earth-boring tool of Embodiment 11, wherein the earth-boring tool is a fixed-cutter rotary drill bit.

Embodiment 13: A method of forming a polycrystalline compact, comprising sintering a plurality of hard particles and a plurality of non-catalytic nanoparticles to form a polycrystalline hard material comprising a plurality of interbonded grains of hard material.

Embodiment 14: The method of Embodiment 13, further comprising selecting the hard particles of the plurality of hard particles to comprise diamond.

Embodiment 15: The method of Embodiment 13 or Embodiment 14, further comprising selecting the nanoparticles of the plurality of non-catalytic nanoparticles to comprise at least one of a metal, a metal alloy, an intermetallic compound, and a ceramic.

Embodiment 16: The method of Embodiment 13 through 15, further comprising selecting the nanoparticles of the plurality of non-catalytic nanoparticles to comprise at least one of a carbide, a nitride, and an oxide.

Embodiment 17: The method of any one of Embodiment 13 through 16, further comprising catalyzing the formation of inter-granular bonds between the grains of hard material.

Embodiment 18: The method of any one of Embodiments 13 through 17, wherein sintering a plurality of hard particles and a plurality of non-catalytic nanoparticles comprises sintering the plurality of hard particles and the plurality of non-catalytic nanoparticles in an HTHP process.

Embodiment 19: The method of any one of Embodiments 13 through 18, further comprising adhering the nanoparticles of the plurality of non-catalytic nanoparticles to exterior surfaces of the hard particles of the plurality of hard particles prior to sintering the plurality of hard particles and the plurality of non-catalytic nanoparticles.

Embodiment 20: The method of Embodiment 19, further comprising functionalizing at least one of the plurality of hard particles and the plurality of non-catalytic nanoparticles to promote adhesion of the nanoparticles of the plurality of non-catalytic nanoparticles to the exterior surfaces of the hard particles of the plurality of hard particles.

Embodiment 21: A method of faulting a cutting element, comprising infiltrating interstitial spaces between inter-bonded grains of hard material in a polycrystalline material with a plurality of non-catalytic nanoparticles.

Embodiment 22: The method of Embodiment 21, further comprising selecting the grains of hard material to comprise diamond grains.

Embodiment 23: The method of Embodiment 21 or Embodiment 22, further comprising selecting the nanoparticles of the plurality of non-catalytic nanoparticles to comprise at least one of a metal, a metal alloy, an intermetallic compound, and a ceramic.

Embodiment 24: The method of any one of Embodiments 21 through 23, further comprising selecting the nanoparticles of the plurality of non-catalytic nanoparticles to comprise at least one of a carbide, a nitride, and an oxide.

The foregoing description is directed to particular embodiments for the purpose of illustration and explanation. It will be apparent, however, to one skilled in the art that many modifications and changes to the embodiments set forth above are possible without departing from the scope of the embodiments disclosed herein as hereinafter claimed, including legal equivalents. It is intended that the following claims be interpreted to embrace all such modifications and changes.

What is claimed is:

1. A polycrystalline compact, comprising:
    a plurality of grains of hard material, the plurality of grains of hard material being interbonded to form a polycrystalline hard material; and
    a plurality of generally spherical non-catalytic nanoparticles disposed in interstitial spaces between the grains of hard material, wherein the nanoparticles of the plurality comprise a material other than diamond.

2. The polycrystalline compact of claim 1, wherein the plurality of non-catalytic nanoparticles comprises a metal.

3. The polycrystalline compact of claim 1, wherein the plurality of non-catalytic nanoparticles comprises a metal alloy.

4. The polycrystalline compact of claim 1, wherein the plurality of non-catalytic nanoparticles comprises a carbide.

5. The polycrystalline compact of claim 1, wherein the plurality of non-catalytic nanoparticles comprises a nitride.

6. The polycrystalline compact of claim 1, wherein the plurality of non-catalytic nanoparticles comprises an oxide.

7. The polycrystalline compact of claim 1, wherein the plurality of grains of hard material comprises grains of diamond.

8. The polycrystalline compact of claim 1, further comprising a catalyst material in the interstitial spaces between the grains of hard material.

9. The polycrystalline compact of claim 1, wherein the plurality of grains of hard material comprises:
    a plurality of smaller grains of hard material having a first average grain size; and
    a plurality of larger grains of hard material having a second average grain size that is at least about one hundred fifty (150) times larger than the first average grain size.

10. The polycrystalline compact of claim 1, wherein a total volume occupied by the plurality of non-catalytic nanoparticles in the polycrystalline hard material is in a range extending from about 0.01% to about 50% of a total volume occupied by the grains of hard material in the polycrystalline hard material.

11. The polycrystalline compact, comprising:
    a plurality of grains of hard material, the plurality of grains of hard material being interbonded to form a polycrystalline hard material; and
    a plurality of non-cayalytic nanoparticles disposed in interstitial spaces between the grains of hard material, wherein the plurality of non-catalytic nanoparticles comprises an intermetallic compound.

12. The polycrystalline compact of claim 11, wherein the nanoparticles of the plurality of non-catalytic nanoparticles comprise platelets or fibers.

13. The polycrystalline compact of claim 11, wherein the nanoparticles of the plurality of non-catalytic nanoparticles comprise generally spherical nanoparticles.

14. A method of forming a polycrystalline compact, comprising sintering a plurality of hard particles and a plurality of generally spherical non-catalytic nanoparticles to form a polycrystalline hard material comprising a plurality of inter-bonded grains of hard material, wherein the non-catalytic nanoparticles of the plurality comprise a material other than diamond.

15. The method of claim 14, wherein the non-catalytic nanoparticles of the plurality comprise a metal.

16. The method of claim 14, wherein the non-catalytic nanoparticles of the plurality comprise a metal alloy.

17. The method of claim 14, wherein the non-catalytic nanoparticles of the plurality comprise an intermetallic compound.

18. The method of claim 14, wherein the non-catalytic nanoparticles of the plurality comprise a carbide.

19. The method of claim 14, wherein the non-catalytic nanoparticles of the plurality comprise a nitride.

20. The method of claim 14, wherein the non-catalytic nanoparticles of the plurality comprise an oxide.

* * * * *